US008820300B2

(12) United States Patent
Aritomi et al.

(10) Patent No.: US 8,820,300 B2
(45) Date of Patent: Sep. 2, 2014

(54) HIGH PRESSURE FUEL SUPPLY PUMP

(75) Inventors: Shunsuke Aritomi, Mito (JP); Kenichiro Tokuo, Hitachinaka (JP); Masayuki Suganami, Iwaki (JP); Satoshi Usui, Hitachinaka (JP); Katsumi Miyazaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 199 days.

(21) Appl. No.: 13/349,082

(22) Filed: Jan. 12, 2012

(65) Prior Publication Data

US 2012/0180764 A1 Jul. 19, 2012

(30) Foreign Application Priority Data

Jan. 14, 2011 (JP) ................................ 2011-005385

(51) Int. Cl.
*F02M 37/04* (2006.01)
*F16J 1/10* (2006.01)

(52) U.S. Cl.
USPC ................ 123/495; 92/129; 74/569; 417/471

(58) Field of Classification Search
USPC ........ 123/495; 417/470, 471; 74/569; 92/129
See application file for complete search history.

(56) References Cited

U.S. PATENT DOCUMENTS 2,465,046 A * 3/1949 Tabb ............................ 417/499
4,355,546 A * 10/1982 Moloney et al. ................ 74/569
5,010,783 A * 4/1991 Sparks et al. ................... 74/527
5,154,532 A * 10/1992 Schaefer et al. .............. 403/301
5,415,533 A 5/1995 Egger et al.
5,752,430 A 5/1998 Kawajiri et al.
5,758,985 A * 6/1998 Yuda ............................... 403/24
5,775,203 A * 7/1998 Osborn et al. .................. 92/128
5,979,297 A * 11/1999 Ricco .............................. 92/129
6,951,165 B2 10/2005 Kuhn et al.
8,070,464 B2 * 12/2011 Grant et al. ................... 417/415

FOREIGN PATENT DOCUMENTS

EP 1 277 951 A2 1/2003
EP 1 788 233 A1 5/2007
JP 10-30525 2/1998
JP 2001-3835 1/2001
JP 2001-41129 2/2001
JP 2001-295754 A 10/2001

(Continued)

OTHER PUBLICATIONS

European Search Report dated Jun. 27, 2013 {Two (2) Pages{.

(Continued)

*Primary Examiner* — Thomas Moulis
(74) *Attorney, Agent, or Firm* — Crowell & Moring LLP

(57) ABSTRACT

In a high pressure fuel supply pump for transmitting rotation of a cam to a reciprocating plunger via a tappet and a retainer, a diametric force acting on the plunger is reduced. The pump includes the retainer disposed on the plunger and a return spring exerting an urging force on the retainer in a direction of the tappet. A clearance between a plunger leading end and a tappet bottom surface opposed thereto is set to be greater than a clearance between a retainer bottom surface and the tappet bottom surface opposed thereto, and a clearance between a retainer inside diameter section and a plunger peripheral surface section opposed thereto is set to be greater than a clearance between a retainer outside diameter section and a tappet inner wall opposed thereto.

15 Claims, 8 Drawing Sheets

(56) References Cited

FOREIGN PATENT DOCUMENTS

| | | | |
|---|---|---|---|
| JP | 2005-514557 | A | 5/2005 |
| JP | 2007-177704 | | 12/2007 |
| JP | 2010-127153 | | 6/2010 |
| JP | 2010-164154 | | 7/2010 |

OTHER PUBLICATIONS

Japanese Office Action dated May 7, 2013 with English translation (5 pages).

English translation of Chinese Office Action dated Dec. 4, 2013 (3 pages).

* cited by examiner

HIGH PRESSURE FUEL SUPPLY PUMP

BACKGROUND OF THE INVENTION

1. Field of the Invention

The present invention relates, in general, to high pressure fuel supply pumps for supplying injectors of internal combustion engines with high pressure fuel and, in particular, to a drive mechanism for a plunger that is slidingly fitted in a cylinder of the pump and that makes a reciprocating motion therein.

Specifically, the present invention relates to an arrangement of a drive mechanism for translating rotation of a cam to a corresponding reciprocating motion of a plunger, the drive mechanism including a tappet having a first surface on which a front surface of the cam abuts and a second surface on which a lower end of the plunger abuts and a spring for pushing the plunger back from a top dead center position to a bottom dead center position, a force of the spring being transmitted to the plunger via a retainer.

2. Description of Related Art

A drive mechanism for a plunger of a high pressure fuel supply pump as disclosed, for example, in JP-2005-514557-T and JP-2001-295754-A is arranged so that a force of a return spring presses the plunger against a surface of a tappet via a retainer at a bottom dead center position of the plunger.

SUMMARY OF THE INVENTION

In the above-referenced drive mechanism, when a rotational motion of the cam is converted to a reciprocating motion of the plunger, a force in a direction crossing an axis of the reciprocating motion of the plunger (a diametric direction of the plunger) acts on the plunger, so that the plunger may slide in a condition inclined relative to a cylinder, resulting in galling therebetween. The force in the direction crossing the reciprocating motion axis of the plunger (the diametric direction of the plunger) may be one that arises from the return spring's being diametrically deformed during compression thereof and a rotational force of the cam acting on the plunger or the retainer diametrically via the tappet.

It is an object of the present invention to provide a high pressure fuel supply pump including a drive mechanism exerting a small force in a direction crossing a reciprocating motion axis of a plunger (a diametric direction of the plunger).

To achieve the foregoing object, an aspect of the present invention provides an arrangement in which a lock section has axial and diametric play between a retainer and a plunger so as to allow the plunger to be released from forces of a return spring and a cam acting thereon, with the cam located at the lowest position, specifically, with the plunger at a bottom dead center position.

Preferably, the lock section is formed by locking an inner peripheral section of the retainer onto an annular necked-down section formed around an end section of the plunger on a side of a tappet.

Preferably, the lock section is formed between an annular intermediate member fixed on an outer periphery of the plunger and the retainer. The annular intermediate member has an outside diameter smaller than an inside diameter of the retainer. The annular intermediate member and the retainer overlap diametrically each other. The lock section has axial and diametric play between the annular intermediate member and the retainer.

Preferably, a clearance between an inside diameter section of the retainer and a peripheral surface section of the plunger opposed thereto is set to be greater than a clearance between an outside diameter section of the retainer and a cylindrical inner wall surface of the tappet opposed thereto.

Preferably, the plunger is formed to be, what is called, shouldered, having a large diameter section fitted slidingly in a cylinder and a small diameter section mounted with a plunger seal. A lock section is formed between an annular intermediate member fixed on an outer periphery of the small diameter section of the plunger and the retainer. The annular intermediate member has an outside diameter smaller than an inside diameter of the retainer. The annular intermediate member and the retainer overlap diametrically each other. The lock section has axial and diametric play between the annular intermediate member and the retainer. The plunger seal is disposed between the intermediate member and an end section of the cylinder. Before the return spring becomes a free length, the large diameter section is adapted to contact a stopper disposed between the plunger seal and the cylinder.

The foregoing arrangements of the aspect of the present invention achieve the following effects.

The retainer and the plunger are spaced apart from each other axially and diametrically at the lock section therebetween, so that a spring force of the return spring acting diametrically is not directly transmitted to the plunger. This allows a surface pressure of a sliding section between the plunger and the cylinder to be reduced.

DESCRIPTION OF THE PREFERRED EMBODIMENTS

Embodiments of the present invention will be described hereinafter with reference to the accompanying drawings.

[First Embodiment]

Figure 1:
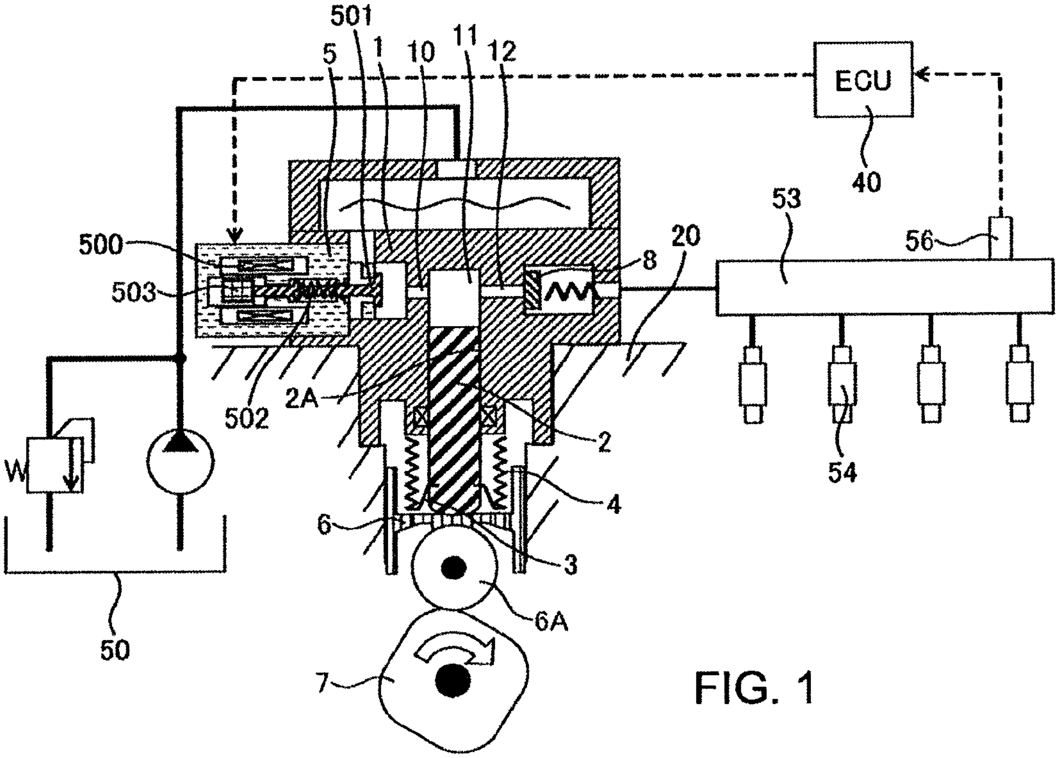
FIG. 1 is a diagram showing general arrangements of a system that embodies first through fourth embodiments of the present invention.

FIG. 1 is a diagram showing general arrangements of a fuel supply system for an internal combustion engine. The high pressure fuel supply pump including a drive mechanism according to the embodiments of the present invention is incorporated in the fuel supply system.

In the high pressure fuel supply pump, a pump housing 1 is inserted and fitted in a mounting hole in a cylinder head 20 in the internal combustion engine and fixed thereto using a bolt not shown.

The pump housing 1 includes a fuel intake passage 10, a pressure chamber 11, and a fuel discharge passage 12 formed therein. The fuel intake passage 10 and the fuel discharge passage 12 are provided with a solenoid valve 5 and a discharge valve 8, respectively. The discharge valve 8 is a check valve that restricts a direction in which fuel circulates.

A plunger 2 is mounted with a retainer 3 that constitutes the drive mechanism. An urging force of a return spring 4 that constitutes the drive mechanism acts on the retainer 3 in a downward direction in FIG. 1. The plunger 2 reciprocates vertically in FIG. 1, as driven by rotation of a cam 7 in the internal combustion engine. Specifically, a vertical movement of a roller 6A in contact with the cam 7 along the trajectory of cam 7 results in a synchronized vertical displacement of a tappet 6 that supports the roller 6A. The plunger 2 abutting on a bottom surface of the tappet 6 slides in a cylinder 2A by being supported therein to thereby advance into, or retract from, the pressure chamber 11, thus varying a volume of the pressure chamber 11. The plunger 2 reaches a top dead center when the cam 7 rotates to a position of the longest distance from a rotational center to thereby push up the plunger 2. For a period of time that begins with this condition and ends when the cam 7 rotates to the position of the shortest distance from the rotational center, the plunger 2, together with the tappet 6, is pushed downwardly in FIG. 1 by a force of the return spring 4 via the retainer 3. During this period, fuel is drawn into the pressure chamber 11 from a valve element 501 that constitutes an intake valve. The plunger 2 reaches a bottom dead center when the cam 7 rotates to the position of the shortest distance from the rotational center. When the cam 7 rotates to a next lobe, the plunger 2 is pushed upwardly via the tappet 6 toward the top dead center, while compressing the return spring 4. If the valve element 501 closes at this time, pressure in the pressure chamber 11 builds up, so that the discharge valve 8 is opened to thereby supply pressurized fuel to a common rail 53. Thus, the vertical movements of the plunger 2 results in repeated pumping operation. As used herein, the term “drive mechanism” refers to a mechanism including at least the retainer 3 and the return spring 4 incorporated integrally in the pump. The cam 7, the roller 6A, and the tappet 6 are herein construed to constitute a drive mechanism on the engine side; nonetheless, the cam 7 and the roller 6A including the tappet 6 are not prevented from being construed to constitute the drive mechanism on the pump side.

The solenoid valve 5 is held in the pump housing 1. The solenoid valve 5 includes a solenoid coil 500, an anchor 503, and a spring 502. The spring 502 exerts an urging force on the valve element 501 in a valve closing direction. As a result, when the solenoid coil 500 is deenergized, the valve element 501 is in a valve closed position. This solenoid valve system is referred to as a normally closed system in that the valve closed position is established when the solenoid coil 500 is deenergized and a valve open position is established when the solenoid coil 500 is energized. Descriptions that follow are based on a system incorporating a normally closed solenoid valve for the intake valve. The present invention can also be embodied in a system that incorporates a solenoid valve system called a normally open system in which the valve element 501 is in a valve open position when the solenoid coil 500 is deenergized. Further, the descriptions that follow are based on a type that integrates the valve element 501 with the anchor 503. The present invention may also be embodied in a solenoid valve including a valve element and an anchor separated from each other.

The common rail 53 is mounted with an injector 54 and a pressure sensor 56. One or two injectors 54 are disposed on each cylinder of the engine. The injector 54 is controlled by a signal from an engine control unit (ECU) 40 for a fuel injection amount for each cylinder.

Operation of the fuel injection system having arrangements as described above will be described in detail below.

A condition of the plunger 2 being displaced downwardly in FIG. 1 by rotation of the cam 7 in the internal combustion engine is referred to as an intake process and a condition of the plunger 2 being displaced upwardly in FIG. 1 by the rotation of the cam 7 is referred to as a compression process. In the intake process, the volume of the pressure chamber 11 increases, while fuel pressure therein decreases. If the fuel pressure in the pressure chamber 11 becomes lower than pressure in the fuel intake passage 10 during the intake process, a force in a valve opening direction as a result of differential fluid pressures of fuel acts on the valve element 501. The force that acts on the valve element 501 then surpasses the urging force of the spring 502 to thereby be open, allowing fuel to be drawn into the pressure chamber 11. If the solenoid coil 500 is energized under this condition, the solenoid coil 500 is kept energized even when the plunger 2 shifts from the intake process to the compression process. A magnetic attractive force is therefore maintained and the valve element 501 maintains a valve open position. The pressure in the pressure chamber 11 is therefore substantially as low as the pressure in the fuel intake passage 10 even in the compression process, so that the discharge valve 8 cannot be opened. Part of fuel representing a decrease in the volume of the pressure chamber 11 is therefore returned to the side of the fuel intake passage 10 by way of the solenoid valve 5. This process is referred to as a return process.

If the solenoid coil 500 is deenergized during the return process, the magnetic attractive force acting on the anchor 503 disappears and, because of the urging force of the spring 502 acting at all times on the valve element 501 and differential fluid pressures of the return fuel, the valve element 501 is closed. Then, immediately thereafter, the fuel pressure in the pressure chamber 11 increases with an upward movement of the plunger 2. As a result, the discharge valve 8 automatically opens and fuel is sent under pressure to the common rail 53.

If the solenoid valve 5 that operates as described above is used, a flow rate of the pump can be controlled by adjusting timing at which the solenoid coil 500 is deenergized.

Figure 2:
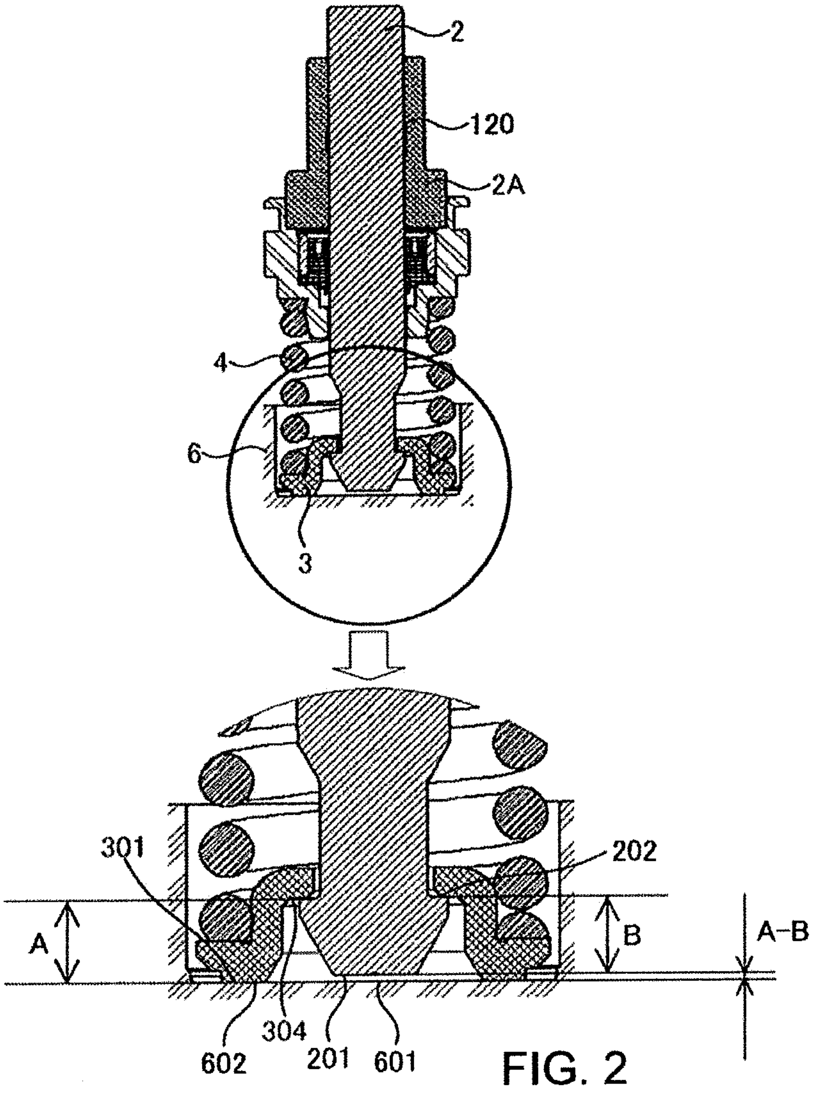
FIG. 2 is a cross-sectional view showing a drive mechanism (in an intake process) according to a first embodiment of the present invention.

FIG. 2 is a cross-sectional view showing the drive mechanism (the retainer and associated members) according to the first embodiment of the present invention during the intake process. In FIG. 2, reference numeral 2 denotes the plunger, reference numeral 2A denotes the cylinder, reference numeral 4 denotes the return spring, reference numeral 3 denotes the retainer, and reference numeral 6 denotes the tappet. The plunger 2 is inserted into the cylinder 2A mounted inside the pump housing 1 not shown and supported by a sliding section 120. The retainer 3 is locked onto a plunger-side lock section 202 formed by a necked-down section 200 formed on an outer periphery of the plunger 2 at an end portion thereof adjacent the drive mechanism. A dimension A from a retainer-side lock section 304 of the retainer 3 to a retainer bottom surface 301 is set to be greater than a dimension B from the plunger-side lock section 202 to a plunger leading end 201. Specifically, axial play is provided between the plunger-side lock section 202 and the retainer-side lock section 304. This results in a structure in which a clearance between the plunger leading end 201 and a tappet bottom surface 601 opposed thereto is greater than a clearance between the retainer bottom surface 301 and a tappet bottom surface 602 opposed thereto. The foregoing arrangement forms a clearance A-B between the plunger leading end 201 and the tappet bottom surface 601, so that the urging force of the return spring 4 directly acts on the tappet 6 via the retainer 3 and the tappet 6 lowers while being urged to the cam 7 not shown. As a result, the urging force of the return spring 4 no longer acts via the plunger 2, which allows a spring force acting diametrically on the plunger 2 to be reduced, so that a surface pressure of the sliding section 120 can be reduced. Meanwhile, the plunger 2, which is locked onto the retainer 3 by the plunger-side lock section 202, follows the lowering motion of the retainer 3.

Figure 3:
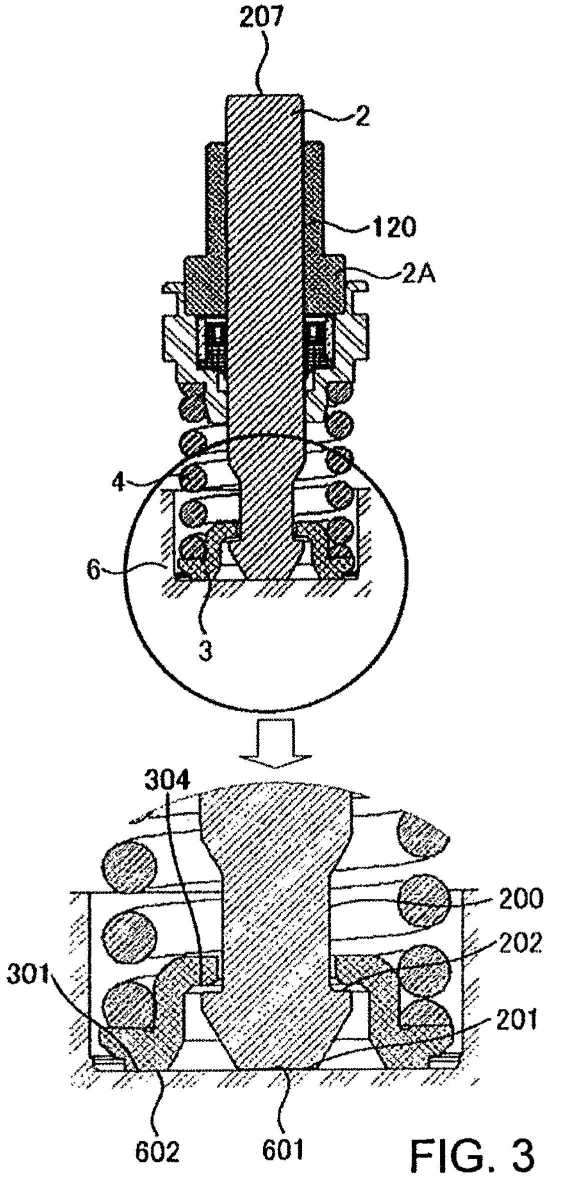
FIG. 3 is a cross-sectional view showing the drive mechanism (in a compression process) according to the first embodiment of the present invention.

FIG. 3 is a cross-sectional view showing the drive mechanism (the retainer and associated members) according to the first embodiment of the present invention during the compression process. In the compression process, pressure of the pressure chamber 11 not shown acts on a plunger upper surface 207, so that the plunger 2 receives a downward force in FIG. 3, which results in the plunger-side lock section 202 being spaced apart from the retainer 3. Then, the plunger leading end 201 contacts the tappet bottom surface 601. When the tappet 6 is pushed upwardly by the cam 7 not shown under this condition, the plunger 2 follows this motion to move upwardly. As such, in the compression process, the plunger 2 and the retainer 3 are spaced apart from each other because of the play between the plunger-side lock section 202 and the retainer-side lock section 304, which allows the spring force acting diametrically on the plunger 2 to be reduced. In addition, the retainer 3 has an inside diameter larger than an outside diameter of the necked-down section 200 of the plunger 2. This provides diametric play in a lock section including the plunger-side lock section 202 and the retainer-side lock section 304, so that diametric displacement of the retainer 3 is less likely to be imparted to the plunger 2.

In summary, in the first embodiment of the present invention, the spring force imparted diametrically to the plunger 2 can be reduced both in the intake process and the compression process, so that the surface pressure of the sliding section 120 can be reduced.

The high pressure fuel supply pump may at times be fastened to the cylinder head 20 not shown with a plurality of bolts. If the multiple bolts are not tightened evenly in this case, the high pressure fuel supply pump is tightened in a tilted condition. Then, if the plunger leading end 201 is urged against the tappet bottom surface 601, a diametric force acts on the plunger 2 due to friction between the plunger leading end 201 and the tappet bottom surface 601 and the high pressure fuel supply pump is tightened with the diametric force as a residual force acting on the plunger 2. Moreover, under such a condition, a central axis of the cylinder 2A is highly likely to be misaligned with an operating point of an axial force of the tappet 6 acting on the plunger 2. It is therefore expected that an excessively large surface pressure will be generated in the sliding section 120 during the compression process in which a large axial force acts on the plunger 2.

In the first embodiment of the present invention, the urging force of the return spring 4 does not act via the plunger 2 and a friction force between the plunger leading end 201 and the tappet bottom surface 601 generated when the high pressure fuel supply pump is mounted is small. The abovementioned diametric force acting on the plunger 2 is therefore less likely to be left. In addition, the plunger leading end 201 is spaced apart from the tappet bottom surface 601 at the bottom dead center at a stroke end of the intake process, so that the diametric force acting on the plunger 2 is released. Further, the plunger 2 follows the cylinder 2A, which brings the operating point of the axial force near to the central axis of the cylinder 2A.

From the foregoing, the first embodiment of the present invention is advantageous also in that the diametric force acting on the plunger 2 generated by the mounting of the high pressure fuel supply pump is reduced.

[Second Embodiment]

Figure 4:
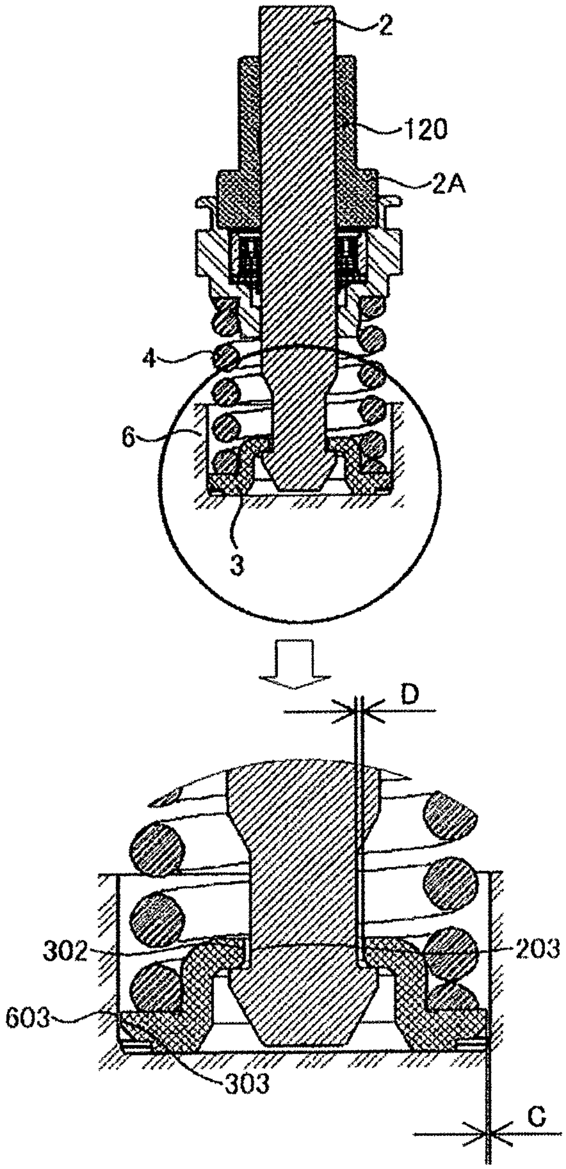
FIG. 4 is a cross-sectional view showing a drive mechanism (in an intake process) according to a second embodiment of the present invention.

FIG. 4 is a cross-sectional view showing a drive mechanism (a retainer and associated members) according to a second embodiment of the present invention during the intake process. In FIG. 4, reference numeral 2 denotes a plunger, reference numeral 2A denotes a cylinder, reference numeral 4 denotes a return spring, reference numeral 3 denotes a retainer, and reference numeral 6 denotes a tappet. In the first embodiment of the present invention, when the force of the return spring 4 acting diametrically on the plunger 2 is generated, the retainer 3 slides in the diametric direction of the plunger 2, so that a retainer inside diameter section 302 and a plunger peripheral surface section 203 opposed thereto contact each other to thereby allow the diametric force to act on the plunger 2. By contrast, the second embodiment of the present invention is arranged such that a distance C between a retainer outside diameter section 303 and a tappet inner wall 603 opposed thereto is smaller than a distance D between the retainer inside diameter section 302 and the plunger peripheral surface section 203 opposed thereto. As a result, the retainer 3, even if it moves in the plunger diametric direction, is restrained by the tappet inner wall 603 and does not accordingly contact the plunger 2. The plunger diametric force can therefore be prevented from acting even more reliably. Having described the intake process, the same effect can also be achieved in the compression process.

Figure 5:
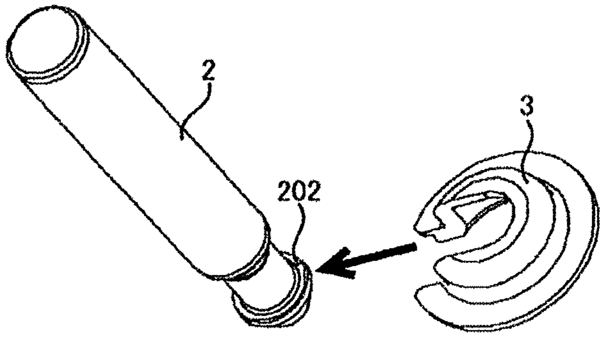
FIG. 5 is a perspective view showing assembly of a C-shaped retainer of the drive mechanism according to the first and second embodiments of the present invention.

FIG. 5 is a perspective view showing assembly of the retainer 3 formed, as an example, of a C-shaped member. The retainer 3 is inserted from the plunger diametric direction into the plunger-side lock section 202 formed in the plunger 2. This enhances assemblability of the retainer 3 and offers a simple structure. If, for example, the retainer 3 is formed through one-piece molding with a press, therefore, ease of processing can also be improved.

[Third Embodiment]

Figure 6:
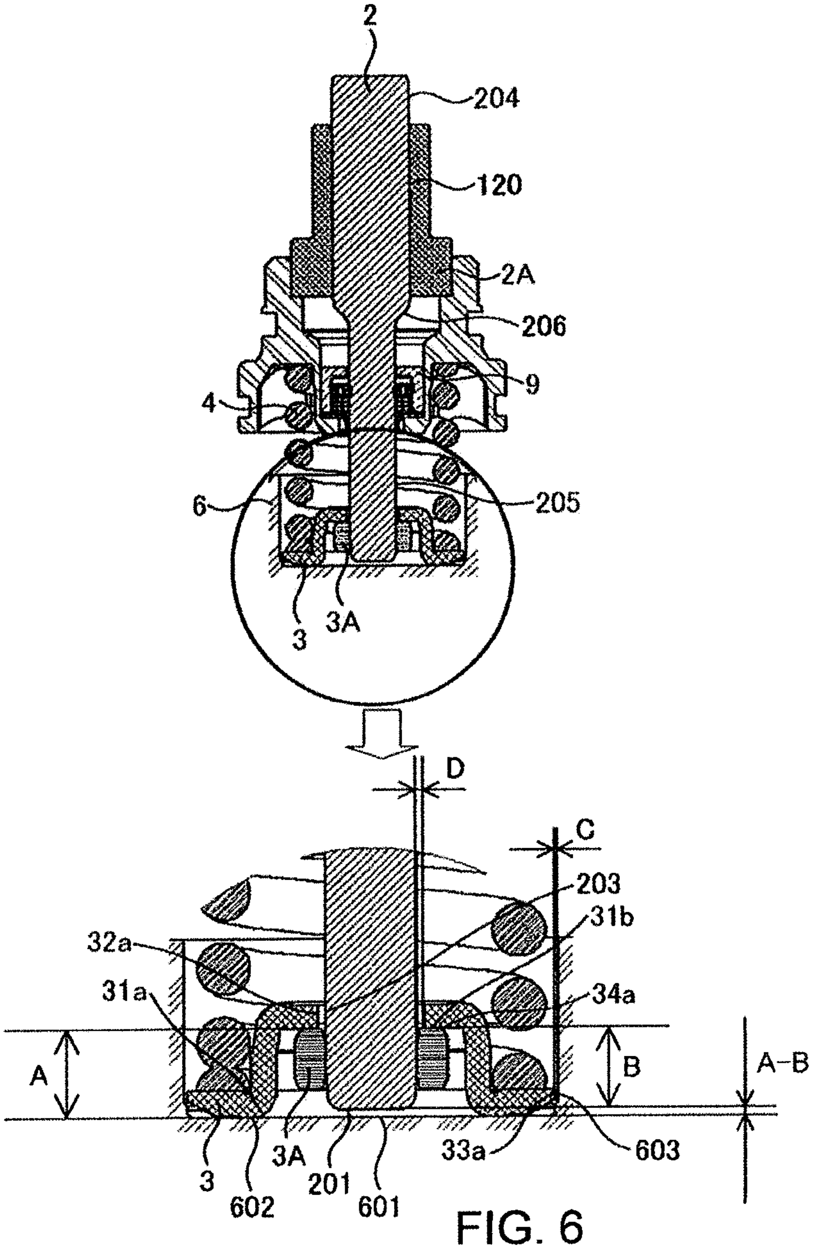
FIG. 6 is a cross-sectional view showing a drive mechanism (in an intake process) according to a third embodiment of the present invention.

FIG. 6 is a cross-sectional view showing a drive mechanism (a retainer and associated members) according to a third embodiment of the present invention during the intake process. In FIG. 6, reference numeral 2 denotes a plunger, reference numeral 2A denotes a cylinder, reference numeral 4 denotes a return spring, reference numeral 3 denotes a retainer, and reference numeral 6 denotes a tappet. The plunger 2 includes a large diameter section 204 and a small diameter section 205. When the plunger 2 lowers as it receives the urging force of the return spring 4, with the high pressure fuel supply pump removed from the cylinder head 20 not shown, a shouldered section 206 formed between the large diameter section 204 and the small diameter section 205 contacts a stopper 9 before the return spring 4 becomes a free length. The retainer includes a retainer 3 bearing a seat of the return spring 4 and an intermediate member 3A, formed integrally with the plunger 2 through, for example, press-fitting, for locking the retainer 3. In the same manner as in the first embodiment, a dimension A from an intermediate member lock section 34*a* of the retainer 3 to a retainer bottom surface 31*a* is set to be greater than a dimension B from a retainer lock section 31*b* formed on the intermediate member 3A to a plunger leading end 201. This results in a structure in which a clearance between the plunger leading end 201 and a tappet bottom surface 601 opposed thereto is greater than a clearance between a retainer bottom surface 31*a* and a tappet bottom surface 602 opposed thereto. The foregoing arrangement forms a clearance A-B between the plunger leading end 201 and the tappet bottom surface 601, so that the urging force of the return spring 4 acts directly on the tappet 6 via the retainer 3 and the tappet 6 lowers while being urged to the cam 7 not shown. As a result, the urging force of the return spring 4 no longer acts via the plunger 2, which allows a spring force acting diametrically on the plunger 2 to be reduced, so that a surface pressure of the sliding section 120 can be reduced. Meanwhile, the plunger 2, which is locked onto the retainer 3 via the intermediate member 3A, follows the lowering motion of the retainer 3. In addition, in the same manner as in the second embodiment, the third embodiment of the present invention is arranged such that a distance C between a retainer outside diameter section 33*a* and a tappet inner wall 603 opposed thereto is smaller than a distance D between a retainer inside diameter section 32*a* and a plunger peripheral surface section 203 opposed thereto. As a result, the retainer 3, even if it moves in the plunger diametric direction, is restrained by the tappet inner wall 603 and does not accordingly contact the plunger 2. The plunger diametric force can therefore be prevented from acting even more reliably. Having described the intake process, the same effect can also be achieved in the compression process.

If the plunger 2 has a long overall length, a distance between the lower end portion of the cylinder 2A and the plunger leading end 201, specifically, an overhang length is long. Applying the principle of leverage, the surface pressure generated in the sliding section 120 increases. If the plunger 2 is made to have an overall length as short as possible in order to avoid the foregoing situation, the plunger leading end 201 is disposed in rear of an end portion of the return spring 4 in a natural length even when the plunger 2 is lowered until the shouldered section 206 contacts the stopper 9. This requires that the retainer 3 be installed with the return spring 4 compressed to some extent, thus aggravating assemblability. As such, a new problem is posed from an assemblability viewpoint, if the retainer 3 is to be mounted in the plunger 2 having the shouldered section 206.

In the third embodiment of the present invention, for example, the retainer 3 formed with a press may be inserted in the plunger 2 and the intermediate member 3A may then be connected to the plunger 2 through press-fitting. This allows the plunger 2 to be assembled with the retainer 3, with the spring compressed at the same time, so that assemblability can be improved with a simple structure.

[Fourth Embodiment]

Figure 7:
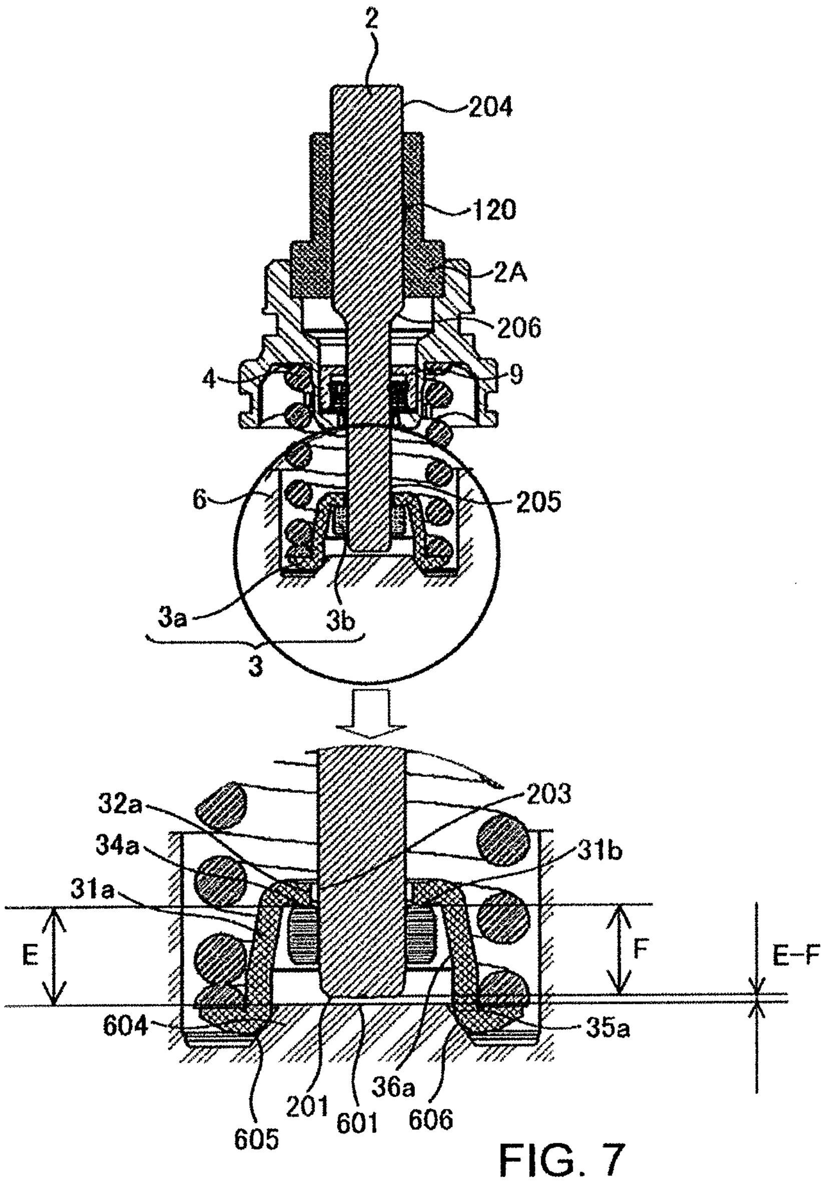
FIG. 7 is a cross-sectional view showing a drive mechanism (in an intake process) according to a fourth embodiment of the present invention.

FIG. 7 is a cross-sectional view showing a drive mechanism (a retainer and associated members) according to a fourth embodiment of the present invention during the intake process. In FIG. 7, reference numeral 2 denotes a plunger, reference numeral 2A denotes a cylinder, reference numeral 4 denotes a return spring, reference numeral 3 denotes a retainer, and reference numeral 6 denotes a tappet. In the same manner as in the third embodiment of the present invention, the plunger 2 includes a large diameter section 204 and a small diameter section 205. When the plunger 2 lowers as it receives the urging force of the return spring 4, with the high pressure fuel supply pump removed from the cylinder head 20 not shown, a shouldered section 206 formed between the large diameter section 204 and the small diameter section 205 contacts a stopper 9 before the return spring 4 becomes a free length. The retainer 3 includes a retainer 3*a* bearing a seat of the return spring 4 and an intermediate member 3*b*, formed integrally with the plunger 2 through, for example, press-fitting, for locking the retainer 3*a*. A protruding section 604 having a tapered section 605 is formed on a bottom surface of the tappet 6. A dimension E from an intermediate member lock section 34*a* to a tappet bottom surface 601 is set to be greater than a dimension F from a retainer lock section 31*b* to a plunger leading end 201. This results in a structure in which a plunger axial clearance between the plunger leading end 201 and the tappet bottom surface 601 opposed thereto is greater than a plunger axial clearance in a contact section 606 between an inner peripheral section 35*a* of a retainer recessed section 36*a* and the tapered section 605 opposed thereto. The foregoing arrangement forms a clearance E-F between the plunger leading end 201 and the tappet bottom surface 601, so that the urging force of the return spring 4 acts directly on the tappet 6 via the retainer 3 and the tappet 6 lowers while being urged to the cam 7 not shown. As a result, the urging force of the return spring 4 no longer acts via the plunger 2, which allows a spring force acting diametrically on the plunger 2 to be reduced, so that a surface pressure of the sliding section 120 can be reduced. Meanwhile, the plunger 2 is locked onto the retainer 3*a* via the intermediate member 3*b*, so that the plunger 2 follows the lowering motion of the retainer 3*a*.

In the diametric direction of the plunger 2, dimensions are set so that a clearance is formed between a retainer inside diameter section 32*a* and a plunger peripheral surface section 203 opposed thereto when the inner peripheral section 35*a* is in contact with the tapered section 605 opposed thereto. This arrangement results in a structure in which a plunger diametric clearance in the contact section 606 between the tapered section 605 and the inner peripheral section 35*a* opposed thereto is smaller than a plunger diametric clearance between the retainer inside diameter section 32*a* and the plunger peripheral surface section 203 opposed thereto. As a result, the retainer 3, even if it moves in the plunger diametric direction, is restrained by the tapered section 605 and does not accordingly contact the plunger 2. The plunger diametric force can therefore be prevented from acting even more reliably. Having described the intake process, the same effect can also be achieved in the compression process.

[Fifth Embodiment]

Figure 8:
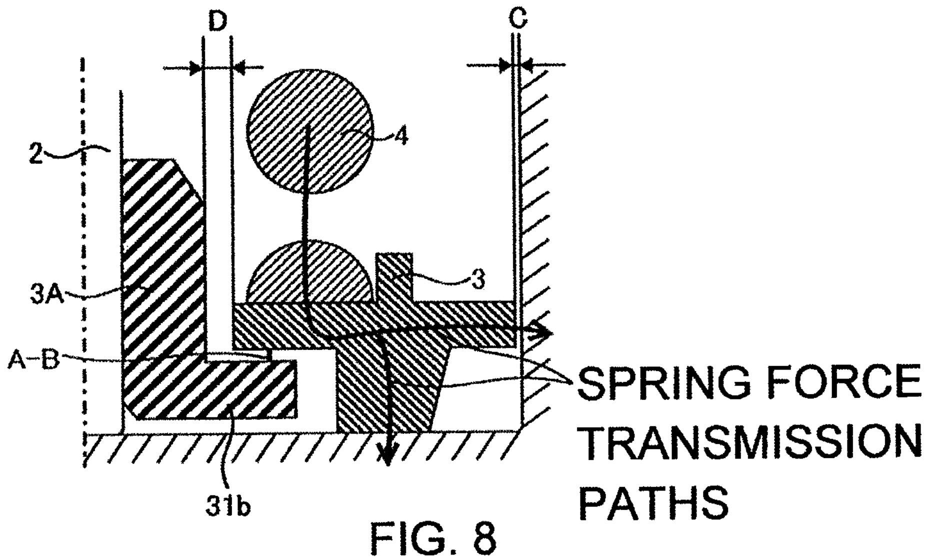
FIG. 8 is a cross-sectional view showing a drive mechanism (in an intake process) according to a fifth embodiment of the present invention.

A fifth embodiment of the present invention will be described below with reference to FIG. 8.

In the fifth embodiment of the present invention, an intermediate member 3A has a flange section as a retainer lock section 31*b*; and an intermediate member lock section 34*a* of a retainer 3 has an inside diameter smaller than an outside diameter of the flange section as the retainer lock section 31*b* so that the retainer lock section 31*b* and the intermediate member lock section 34*a* overlap each other to thereby form a lock section.

The play of A-B is formed between the flange section as the retainer lock section 31*b* and the intermediate member lock section 34*a* of the retainer 3, which is a feature found also in the third embodiment of the present invention.

Another feature found also in the third embodiment of the present invention is that a clearance D between an inside diameter surface of the retainer 3 and an outer peripheral surface of the intermediate member 3A opposed thereto is set to be greater than a clearance C between an outside diameter surface of the retainer 3 and an inner peripheral surface of the tappet 6 opposed thereto, so that, despite the presence of diametric play in the lock section, the retainer 3 is less easily displaced to the side of the plunger 2 (in the inside diameter direction). As shown by an arrow in FIG. 8, a force of the spring acting diametrically relative to a plunger axis is transmitted to an outside in the diametric direction of the retainer 3, but not to the side of the intermediate member 3A on the inside.

The first through fifth embodiments of the present invention described heretofore can also solve the related art problems described below.

Strenuous efforts are currently being made toward size reduction, higher output, and higher efficiency of internal combustion engines. There is therefore a strong need for the high pressure fuel supply pump to ensure discharged fuel under higher pressure with a greater flow rate in order to respond to the need for body size reduction and higher output and efficiency that improve the pump's mountability on the internal combustion engine. The need has resulted in an increasing trend toward heavier load on the sliding section, which poses a new challenge of load reduction from the viewpoint of reliability. Against this background, a need is now to provide a compact and simply structured retainer that reduces a diametric force acting on the plunger as a sliding member.

Generally, to increase the discharge pressure of the high pressure fuel supply pump, each member of the pump is needed to be improved in pressure resistance, which unfortunately leads to increased mass of members. Increased mass of a moving part calls for an increased urging force of the return spring in order to counteract an inertia force that increases therewith. This unfortunately results in an increased spring force developing unintentionally in a direction perpendicular to an axial direction of the spring, specifically, a diametric direction of the spring.

As disclosed in JP-2005-514557-T, if the retainer is directly connected to the plunger to thereby bear the spring force, all of the spring force is transmitted to the tappet via the plunger, so that the diametric spring force acts on the plunger, unfavorably resulting in an increased surface pressure of the sliding section. As disclosed in JP-2001-295754-A, if the retainer is locked onto the plunger via the inclined annular surface formed on the retainer, a moment to tilt the retainer can be prevented from being transmitted to the plunger on one hand; on the other, the diametric spring force acts on the plunger, which poses a problem.

Consider the arrangement in which a shouldered plunger includes a large diameter section and a small diameter section and, when the plunger moves toward the tappet as the plunger receives the urging force of the return spring, the large diameter section of the plunger contacts a stopper before the return spring becomes a free length. If the overall length of the plunger is made as short as possible, the retainer needs to be installed with the return spring compressed. This poses a new problem from the assemblability viewpoint.

The embodiments of the present invention can provide a high pressure fuel supply pump mounted with a drive mechanism that achieves a reduced diametric force acting on a plunger with a compact and simple structure.

In the embodiments of the present invention, the tappet retrains a movement of the retainer moving in the plunger diametric direction, so that the diametric spring force of the return spring acts on the tappet and is not transmitted to the plunger. This reliably reduces the surface pressure of the sliding section of the plunger.

With the arrangement in which the shouldered plunger is incorporated, connecting the intermediate member with the plunger through, for example, press-fitting allows the return spring to be compressed at the same time with the press-fitting work, so that assemblability can be improved.

The embodiments of the present invention allow the diametric force acting on the plunger to be reduced in the high pressure fuel supply pump in which rotation of the cam is transmitted to the reciprocating plunger via the tappet and the retainer.

Specifically, the high pressure fuel supply pump includes the retainer disposed on the plunger and the return spring exerting the urging force on the retainer in the direction of the tappet. The clearance between the plunger leading end and the tappet bottom surface opposed thereto is set to be greater than the clearance between the retainer bottom surface and the tappet bottom surface opposed thereto. And the clearance between the retainer inside diameter section and the plunger peripheral surface section opposed thereto is set to be greater than the clearance between the retainer outside diameter section and the tappet inner wall opposed thereto.

The foregoing arrangements make the plunger diametric force involved in flexural deformation or shear deformation of the spring less easy to be transmitted to the plunger.

As a result, a fault of the plunger galling the cylinder inner wall can be reduced.

The present invention is widely applicable to various types of high pressure pumps, in addition to the high pressure fuel supply pump in the internal combustion engine.

What is claimed is:

1. A high pressure fuel supply pump, comprising:

a plunger driven by a tappet that follows rotation of a cam in an internal combustion engine to thereby make a reciprocating motion; and a retainer disposed on the plunger;

a return spring for exerting an urging force to urge the retainer in a direction of the tappet; wherein:

axial and diametric clearance is formed at a lock section of the retainer and the plunger in area between a leading end of the plunger and a bottom surface of the tappet opposed thereto so as to allow the plunger to be released from forces of the return spring and the cam acting thereon at a bottom dead center of the plunger, a bottom surface of the retainer and a bottom surface of the tappet opposed thereto being in abutment;

the plunger includes a large diameter section and a small diameter section;

the plunger further includes a stopper which contacts the large diameter section before the return spring becomes a free length when the plunger moves toward the tappet as the plunger receives the urging force of the return spring; and the lock section includes the retainer for bearing the return spring and an intermediate member fixed to the plunger, the intermediate member for locking the retainer.

2. The high pressure fuel supply pump according to claim 1, wherein:

at the bottom dead center of the plunger, a clearance between a leading end of the plunger and a bottom surface of the tappet opposed thereto is formed to be greater than a clearance between a bottom surface of the retainer and the bottom surface of the tappet opposed thereto.

3. The high pressure fuel supply pump according to claim 1, wherein:

the clearance between an inside diameter section of the retainer and a peripheral surface section of the plunger opposed thereto is greater than the clearance between an outside diameter section of the retainer and the inner wall of the tappet opposed thereto.

4. The high pressure fuel supply pump according to claim 1, wherein:

the clearance between the inside diameter section of the retainer and a peripheral surface section of the intermediate member opposed thereto is greater than the clearance between the outside diameter section of the retainer and the inner wall of the tappet opposed thereto.

5. The high pressure fuel supply pump according to claim 1, wherein:

the retainer is formed of a C-shaped member, and inserted from a plunger diametric direction into a lock section formed on the plunger and locked in a plunger axial direction.

6. The high pressure fuel supply pump according to claim 1, wherein:

the tappet has a protrusion formed on a bottom surface thereof and the retainer has a recess formed in a bottom surface thereof and opposed to the protrusion; and the clearance between the inside diameter section of the retainer and the peripheral surface section of the plunger opposed thereto is greater than a clearance between an outside diameter section of the protrusion and an inner peripheral section of the recess.

7. The high pressure fuel supply pump according to claim 1, wherein:

the tappet has a protrusion formed on a bottom surface thereof and the retainer has a recess formed in a bottom surface thereof and opposed to the protrusion;

a plunger axial clearance between a leading end of the plunger and a bottom surface of the tappet opposed thereto is greater than a plunger axial clearance in a contact section between a taper disposed on the protrusion and an inner peripheral section of the recess opposed thereto; and a plunger diametric clearance between an inside diameter section of the retainer and a peripheral surface section of the plunger opposed thereto is greater than a plunger diametric clearance in the contact section between the taper and the inner peripheral section opposed thereto.

8. The high pressure fuel supply pump according to claim 6, wherein:

the plunger includes a large diameter section and a small diameter section;

the plunger further includes a stopper which contacts the large diameter section before the return spring becomes a free length when the plunger moves toward the tappet as the plunger receives the urging force of the return spring; and the lock section includes the retainer and an intermediate member formed integrally with the plunger through, for example, press-fitting, the intermediate member for locking the retainer.

9. The high pressure fuel supply pump according to claim 6, wherein:

the intermediate member has a flange that, together with the retainer, constitutes a lock section.

10. The high pressure fuel supply pump according to claim 2, wherein:

the retainer is formed of a C-shaped member, and inserted from a plunger diametric direction into a lock section formed on the plunger and locked in a plunger axial direction.

11. The high pressure fuel supply pump according to claim 3, wherein:

the retainer is formed of a C-shaped member, and inserted from a plunger diametric direction into a lock section formed on the plunger and locked in a plunger axial direction.

12. The high pressure fuel supply pump according to claim 2, wherein:

the tappet has a protrusion formed on a bottom surface thereof and the retainer has a recess formed in a bottom surface thereof and opposed to the protrusion; and the clearance between the inside diameter section of the retainer and the peripheral surface section of the plunger opposed thereto is greater than a clearance between an outside diameter section of the protrusion and an inner peripheral section of the recess.

13. The high pressure fuel supply pump according to claim 2, wherein:

the tappet has a protrusion formed on a bottom surface thereof and the retainer has a recess formed in a bottom surface thereof and opposed to the protrusion;

a plunger axial clearance between a leading end of the plunger and a bottom surface of the tappet opposed thereto is greater than a plunger axial clearance in a contact section between a taper disposed on the protrusion and an inner peripheral section of the recess opposed thereto; and a plunger diametric clearance between an inside diameter section of the retainer and a peripheral surface section of the plunger opposed thereto is greater than a plunger diametric clearance in the contact section between the taper and the inner peripheral section opposed thereto.

14. The high pressure fuel supply pump according to claim 7, wherein:

the plunger includes a large diameter section and a small diameter section;

the plunger further includes a stopper which contacts the large diameter section before the return spring becomes a free length when the plunger moves toward the tappet as the plunger receives the urging force of the return spring; and the lock section includes the retainer and an intermediate member formed integrally with the plunger through, for example, press-fitting, the intermediate member for locking the retainer.

15. The high pressure fuel supply pump according to claim 7, wherein:

the intermediate member has a flange that, together with the retainer, constitutes a lock section.

* * * * *